(12) United States Patent
Rhodes et al.

(10) Patent No.: US 8,204,189 B2
(45) Date of Patent: Jun. 19, 2012

(54) DATA DOWNLOAD SYSTEM AND METHOD

(75) Inventors: David Charles Rhodes, Auckland (NZ); Christopher Kimberley Laird, Auckland (NZ)

(73) Assignee: Fisher & Paykel Appliances Limited, Auckland (NZ)

( * ) Notice: Subject to any disclaimer, the term of this patent is extended or adjusted under 35 U.S.C. 154(b) by 1357 days.

(21) Appl. No.: 11/832,058

(22) Filed: Aug. 1, 2007

(65) Prior Publication Data

US 2008/0036619 A1 Feb. 14, 2008

Related U.S. Application Data

(60) Provisional application No. 60/822,100, filed on Aug. 11, 2006.

(51) Int. Cl.
*H04M 11/00* (2006.01)
(52) U.S. Cl. .............................. 379/106.03; 379/102.07
(58) Field of Classification Search ............. 379/102.07, 379/106.01–106.11; 702/35
See application file for complete search history.

(56) References Cited

U.S. PATENT DOCUMENTS

| | | | | |
|---|---|---|---|---|
| 4,829,560 A * | 5/1989 | Evanyk et al. | ........... | 379/106.11 |
| 5,586,174 A * | 12/1996 | Bogner et al. | ........... | 379/106.01 |
| 5,838,776 A * | 11/1998 | Adkins et al. | ............ | 379/102.05 |
| 5,987,105 A | 11/1999 | Jenkins et al. | | |
| 6,415,023 B2 * | 7/2002 | Iggulden | ................ | 379/102.03 |
| 6,480,586 B1 * | 11/2002 | Hayes et al. | ............. | 379/102.02 |
| 6,496,575 B1 * | 12/2002 | Vasell et al. | ............. | 379/102.05 |
| 6,678,285 B1 * | 1/2004 | Garg | ............................. | 370/473 |
| 6,697,466 B2 * | 2/2004 | Howard et al. | ............ | 379/93.37 |
| 6,760,686 B2 * | 7/2004 | Okada | .......................... | 702/187 |
| 6,828,906 B2 * | 12/2004 | Malcolm et al. | .............. | 340/505 |
| 7,130,383 B2 * | 10/2006 | Naidoo et al. | .................. | 379/37 |
| 7,490,011 B2 * | 2/2009 | Cottrell | ........................... | 702/39 |

\* cited by examiner

*Primary Examiner* — Simon Sing
(74) *Attorney, Agent, or Firm* — Clark Hill PLC (57) ABSTRACT

An appliance having a diagnostic capability includes a tone generator, a controller, a data collection function, memory for storing the collected data, and a transmitter. The transmitter transmits a stream of data derived from the stored data using a carrier signal. The carrier signal is switched on and off according to bits in a stream of data derived from the stored data. The transmission also includes interleaving each bit for transmission with an off period of the carrier. Each off period of the carrier has a duration of at least 100 milliseconds.

24 Claims, 6 Drawing Sheets

DATA DOWNLOAD SYSTEM AND METHOD

PRIORITY

This application claims priority from U.S. Provisional Patent Application Ser. No. 60/822,100, filed Aug. 11, 2006, the disclosure of which is incorporated herein by reference.

FIELD OF THE INVENTION

This invention relates to a data download system and method for appliances, in particular to a system and method that overcomes issues that arise from gain control, filtering and phase corruption on mobile phone handsets.

BACKGROUND

Some home appliances (such as laundry washing machines and refrigerators) are today fitted with a serial communications port (or other similar output device) allowing the appliance to be connected to a personal computer which, utilising purpose built software, may interrogate information stored within the appliance. The information stored by the appliance may include the present status appliance, temperatures, status of valves/shutters, user settings, fault information and number of cycles completed.

As it is sometimes difficult or inconvenient for a service person to visit the site at which the appliance is located (which may be many kilometres from the service person's base) some existing home appliances have been fitted with modems to allow a service person to remotely interrogate data stored in the appliance. However, the additional cost involved in fitting all production appliances with a modem is unacceptably high. In addition, the user of the machine would be required to connect a telephone line to the appliance (either sharing an existing telephone line or installing a new one) and this is clearly unacceptable.

Most modern home appliances are at least fitted with a sound generating device (for example a simple piezo-electric device) to, for example, alert the user that the washing cycle of a laundry washing machine or dishwasher is completed or the door of a refrigerator is open. Accordingly, it would be an advantageous improvement to utilise the existing noise producing capability of the appliance in the production of a data signal rather than adding additional hardware.

Our earlier U.S. Pat. No. 5,987,105 describes appliances with inbuilt sound generating capability used for data communication over a standard phone network. However, the recent popularity of cell phones and other digital phone systems has brought with it several obstacles to known transmission techniques. Cell phones incorporate signal processing features such as automatic gain control, noise filtering and phase distortion. These features make achieving modem data transfer by existing methods difficult or impossible.

SUMMARY OF THE INVENTION

In a first aspect the invention may be broadly be said to consist in an appliance comprising:
  a tone generator
  a controller having a data collection function and memory for storing collected data
  a transmitter adapted to drive said tone generator to transmit a stream of data derived from said stored data using a carrier having a frequency within the frequency band of telephone systems, including
    switching the carrier on and off according to bits in the data stream, and
    interleaving each bit for transmission with an off period of the carrier, wherein
  each off period has a duration of at least 100 ms.
  Preferably said off period duration is at least 200 ms.
Preferably each said transmission bit has a duration less than 1000 ms.
  Preferably said controller is programmed to activate said tone generator for user interface functions.
  Preferably said frequency of said carrier is between 300 Hz and 4000 Hz.
  Preferably said frequency of said carrier is between 2500 Hz and 3000 Hz.
  Preferably said transmitter causes said tone generator to generate additional sound, in said off periods of said carrier, that is outside the frequency band of the telephone system, but is available to humans.
  Preferably said additional sound is below 300 Hz. The additional sound informs a user that transmission is ongoing, despite potentially long pauses. The sound may be continuous or intermittent, and may be a constant or varying frequency.
  Preferably said transmitter is adapted to transmit said data stream as a formatted packet, and to transmit data identifying a data format applicable to said data packet.
  Preferably said identifying data comprises a header preceding the packet.
  Preferably said transmitter transmits said header using a carrier frequency distinct from the carrier frequency used for transmitting said data packet.
  In a second aspect the invention may be broadly be said to consist in a receiver comprising a computer executing a program to receive a signal,
    generate a digital representation of said signal,
    process said digital representation to find the centre frequency of said signal,
    process said digital representation with a filter at said centre frequency,
    generate a temporal bit map according to said centre frequency based on an expected sequence of data-bits interleaved with off periods having duration of at least 200 ms,
    align said temporal bit map with said filtered digital representation to extract the data bits.
  Preferably said digital representation is a standard audio file
  Preferably the software finds said centre frequency by performing a Fast Fourier Transform on said digital representation and identifying the peak.
  Preferably said temporal bit map has a bit period according to the bit width chosen for transmission, wherein said bit period is determined in a transmission preamble.
  Preferably said temporal bit map is a square wave.
  Preferably the software shifts said temporal bit map shifted relative to said filtered digital representation to find a point of maximum product, said point of maximum product corresponding to the temporal bit map aligning with the bit boundaries of the filtered signal.
  Preferably the software sets a zero—one amplitude threshold for each said digital representation.
  This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

DETAILED DESCRIPTION OF THE PREFERRED EMBODIMENT

Sophisticated modern appliances include electronic controllers. The presence of electronic controllers allows data logging. Data logging is particularly useful for analysing faults or performance. A standard modem could be included in the appliance, however the appliance may not be readily brought near a suitable communication socket and it is impractical to expect customers to rewire residences to bring a communication socket near the appliance. Furthermore increasingly customers are foregoing fixed line telephone service and relying on cellular mobile telecommunications. A standard modem in the appliance will be an unusable feature for these customers.

Typical appliances that might include a communication system according to the present invention are the large bulky appliances commonly referred to as whiteware. For example refrigerators, washing machines, dryers and cookers now often include microcomputer based controllers that record data of the functioning of the device. Devices according to the present invention include such electronic controllers having memory for storing logged data and for storing control programs. The memory for storing logged data and the memory for storing the control program may be separate areas of the same physical memory or may be separate banks of physical memory. The controller drives, directly or indirectly, various operations of the appliance, and receives feedback, directly or indirectly, in relation to the performance and operating conditions of the appliance.

The appliance includes a tone generating device, such as a loudspeaker or buzzer which is driven directly or indirectly by the controller. For example the tone generator may be a piezo-electric device operating as a small loudspeaker. Appropriate circuits for driving a tone generator of varying type using an electronic controller within the knowledge of persons skilled in the art.

Figure 3:
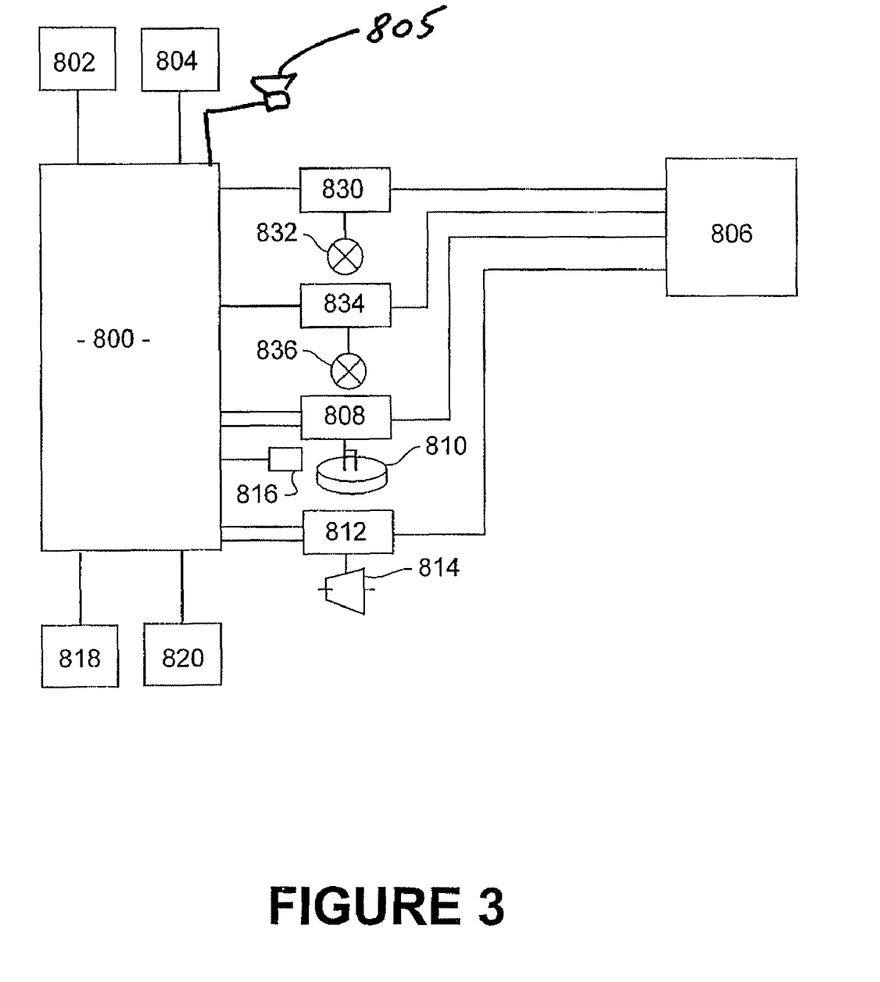
FIG. 3 is a block diagram of the controller and electronics of the appliance as they apply to the present invention.

A typical control system is illustrated in FIG. 3. The illustrated control system is for coordinating the operations of the laundry machine. The controller includes a microcontroller 800. The microcontroller may include a microcomputer and ancillary logic circuits and interfaces. The microcontroller receives user input commands on user interface 802. The user interface may include, for example, a plurality of touch controls such as switches or buttons, or may include a touch screen, or may include rotary or linear selection devices. The microcontroller may include a display device 804 and tone generator 805 to provide feedback to a user. The display device may comprise a plurality of indicators, such as lights or LEDs, or may include a screen display. The display device 804 and the user interface 802 may be mounted to a single module incorporating the microcontroller.

The microcontroller receives power from a power supply 806. The microcontroller also controls power switches 808 applying power from supply 806 to drive motor 810. The microcontroller controls further power switches 812 applying power from supply 806 to a pump 814. The microcontroller also controls a power switch 830 applying power to a cold water inlet valve 832 and a power switch 834 applying power to hot water inlet valve 836. The microcontroller preferably receives feedback from position sensors 816 associated with the motor. The microcontroller also preferably receives input from a water level sensor 818, which detects the level of water in the tub of the machine, and from a temperature sensor 820 which detects the temperature of water being supplied to the wash tub.

These later inputs and outputs allow for the controller to control operation of the laundry appliance. Clearly other controllers for laundry appliances may or may not have the same collection of sensors and control equipment. The illustrated controller is provided by way of example only.

The inventors have discerned problems for previously proposed data download systems that use audible sound transmission through telephone handsets, when these systems are used with cellular telephones, or digital remote phones.

Automatic gain control from a cellular telephone adjusts the volume of the sound transmitted. On receiving a loud noise the gain control will attenuate the signal. Using prior art data transmission systems the automatic gain control perceives the series of tones generated by the appliance as a loud noise and reduces the gain so that the signal becomes almost undetectable at the receiving end.

Another potential problem in cell phones is the noise cancelling feature. Most cell phones utilise two microphones. Usually one microphone is located at each end of the phone. The common sound picked up simultaneously by both microphones is cancelled. The difference between signals from each microphone represents the sound to be transmitted.

Figure 1:
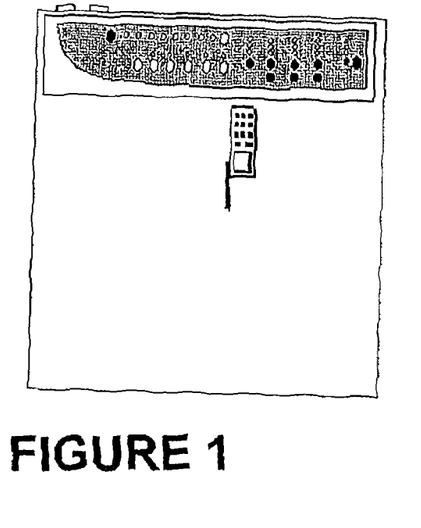
FIG. 1 is an illustration of a cordless or mobile phone positioned adjacent the console of a washing machine.

When positioning a cell phone with an appliance it is important that the relative position of the microphones is considered. Holding a cell phone up such that both microphones could potentially receive the same signal strength may result in the data download tones being cancelled. FIG. 1 illustrates the preferred positioning of a cell phone relative to the appliance tone generator to ensure the signal is received by a two microphone system with a phase delay.

The auto gain control feature detects a loud noise and attenuates the signal. The inventors have discovered that it is possible to send short bursts of loud noise without the auto gain feature activating. Tests have shown a range of maximum tone durations before the auto gain control activates. A table of results is included at the end of the document showing test data for several different telephone handsets. In practise the applicants have found that a maximum noise duration less than approximately 350 ms avoids auto gain interference for the full range of tested phones. The maximum duration is not so critical for the scheme proposed, longer tones only serve to reduce the data transmission rate.

The inventors have also found that the gain control is sensitive to the temporal gap between the loud noises. When the gap between tones is short the auto gain control activates and alternates the sound. The results of the applicant's experiments suggest that if the gap between noises is less than 125 ms then the auto gain control of some phones may be activated.

According to the present invention the controller is programmed to provide a data log output function that emits a series of tones using the tone generator, whereby the tones emitted allow for transmission of the data to a call centre using present generation mobile and remote telephone technology. The tone generation is controlled according to predetermined data formats that overcome the discerned problems of using mobile handsets. This data output function is preferably activated by selection of a data download function using the user interface provided by the appliance. When the data output function is activated the user may be prompted to hold their telephone handset adjacent the tone generator output of the appliance, for example as illustrated in FIG. 1. The controller may be programmed to wait for user confirmation with driving the tone generator to generator the tone sequence for data transmission.

Preferred tone output format to provide a margin of error a data rate of one bit per 400 ms has been selected. This results in a maximum data rate due to the auto gain control of 2.5 bits/s.

The format of the raw signal is a data bit width of 200 ms followed by a no data space of 200 ms. A data bit '1' state is indicated by a 2.8 kHz or 2.7 kHz carrier for 200 ms, and silence for 200 ms. A data bit '0' is indicated by silence for 400 ms.

A 100 Hz tone is present during the download so that the user does not think the download is over. The 100 Hz tone does not provide any data and is filtered out by filters built into any telephone. The tone may be continuous or intermittent.

The carrier frequencies chosen have a basic requirement to fall within the frequency range that can be transmitted over a typical telephone system. This typical frequency range is between 300 Hz and 3 kHz. The selected preferred frequencies also happen to be efficiently created by a preferred piezo-sound generating device. Other frequencies may be chosen according to desirable criteria for the tone generator concerned.

Each transmission session is structured according to a predetermined protocol. The protocol includes an overall session structure illustrated in Table 1.

TABLE 1

| | |
|---|---|
| Pre Amble | 2.7 kHz |
| Main Download | 2.8 kHz |
| Post Amble | 2.7 kHz |

Preamble—2.7 khz

The preamble bits are used by PC based software to identify the type of data and format to expect for the main data portion of the download.

The preamble format frequency and data rate should never change. It is these bits that tell different modem download techniques apart. If a single software package is to be used to decode modem downloads for many different products then it must be able to rely on the preamble to tell it what type of modem download to expect. Therefore this part of the modem download protocol should remain standard.

By varying the preamble bits the following properties can be changed from version to version or product to product as the necessity arises:

the data rate.
main download data bit frequencies used.
type of CRC.
type of data ID.

The preamble (and postamble) preferably distinguishes itself from the rest of the download by using a different frequency. For example in the preferred embodiment 2.7 khz. According to this approach the preamble can vary in length indefinitely. The fact that the main download changes to a different frequency that terminates the preamble. However the present method involves slow download speeds so a short duration preamble is preferred. A preferred format is used for the preamble bits. This format ensures that only the required number of bits are transmitted to get the information across. The information is essentially an identifier defining the version of download software enabled in the product. This could reflect the age of the product or the data format type used by the product. Different data format types may apply to different models or classes of appliance (eg. Dishwashers, laundry machines, cooktops or refrigerators) which have different data logging functions.

According to the preferred data format the first and last bit of the preamble must be a 1. In this way earlier versions require a preamble with only one or two bits, but any number of later versions can be accommodated as they arise without affecting the number of bits required in earlier versions. For example if the download software version has increased such that four preamble bits are required distinguish different products enabled with download then these combinations are valid:

1
11
101
111
1001
1101
1011
1111

Main Download

The makeup of a data packet constituting the main download is illustrated in Table 2.

TABLE 2

| # Bits | Field Name |
|---|---|
| 1 | Start Bit |
| 1 | Zero Bit |
| 101 | Data |
| 8 | CRC |
| 8 | Data ID |
| 1 | Stop Bit |

Start Bit, Zero Bit and Stop Bit—2.8 khz

The start and zero bits will always be the first data in the 'main download' section of the download. The start bit (1) and the zero bit (0) are used to determine what a one and zero look like on the current line. Due to noise etc, these values will vary from download to download.

The stop bit is used to identify the end of the 'main download' section of the download.

Data—2.8 khz

The data section of the 'main download' contains all the information relevant to the user. An example of the sort of information that the data section could contain is provided by Table 3.

TABLE 3

| # Bits | Field Name |
|---|---|
| 6 | Cycle Count at Warning |
| 8 | MC SW Version # |
| 8 | EEP Version # |
| 8 | Fault Code A |
| 8 | Fault Code B |
| 4 | Fault Motor State A |
| 4 | Fault Motor State B |
| 4 | Fault Progress A |
| 4 | Fault Progress B |
| 6 | Cycle Count at Fault A |
| 1 | Recycle Flag |
| 1 | Restart Flag |
| 6 | Cycle Count at Fault B |
| 2 | Spacer |
| 8 | Fault Retry Count |
| 4 | Warning # |
| 4 | Progress at Warning |
| 4 | Brownout Exit State |
| 4 | Progress at Brownout |
| 3 | Water Level at Fault A |
| 3 | Water Level at Fault B |
| 1 | Hot Bowl Flag |

CRC—2.8 khz

The CRC provides a basic download integrity check. On the product side a 16 bit CRC is calculated but only the least significant byte is used. The CRC is calculated on all of the 'main download' data, including start, zero stop bits and data_ID.

Data_ID—2.8 khz

The data_ID is similar in function to the preamble except it is used to identify the structure and contents of the 'data' section of the download. If the data section contents or structure changes then the data_ID must be changed also. This allows the PC based modem download software to identify what the data is and interpret it correctly for the user. Unlike the preamble the data_ID is just a normal 8-bit number.

Postamble 2.7 khz

The postamble uses a 2.7 khz tone to differentiate it from the main download data. Basically the postamble is a stop bit with a few trailing zeros.

After the postamble the carrier and the 100 Hz overlay tone cease and control of the appliance is returned to the user at the user interface.

Reception and Analysis

For data download the user or a service technician phones the product helpdesk. The helpdesk has access to a data download software package, for example on their personal computer (PC). The user or service technician holds the phone up to the product and places the product into data download mode using a predetermined key press combination. Once the data download is complete the PC software decodes the data and either flags a CRC error or displays to the helpdesk operator the information received. The downloaded information can then be used by both parties to diagnose the fault.

Using this system the service technician or product user simply needs a phone and the correct key combination to enter data download mode. According to the improvements of the present invention, the phone may include a mobile phone or remote phone.

The helpdesk operator may have a PC with a suitable sound digitising device and software for analysing the digitised download signal.

Figure 2:
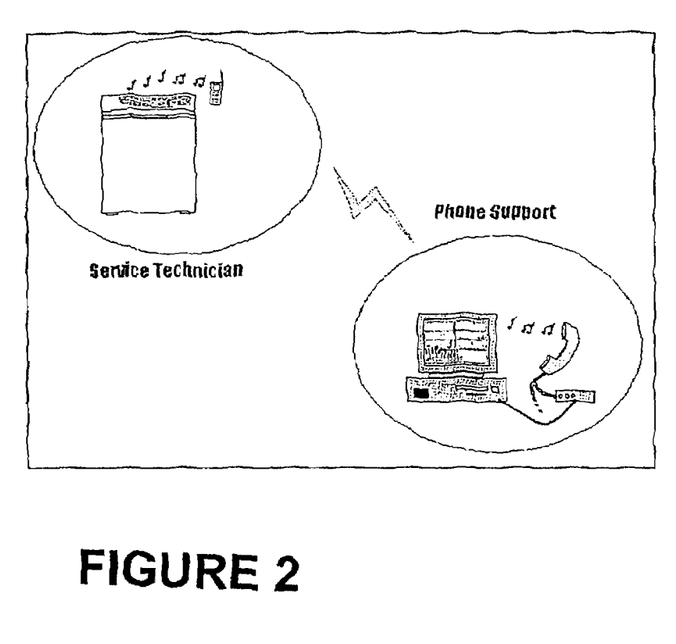
FIG. 2 is an illustration of the components used in this system.

These components are broadly illustrated in FIG. 2.

Figure 4:
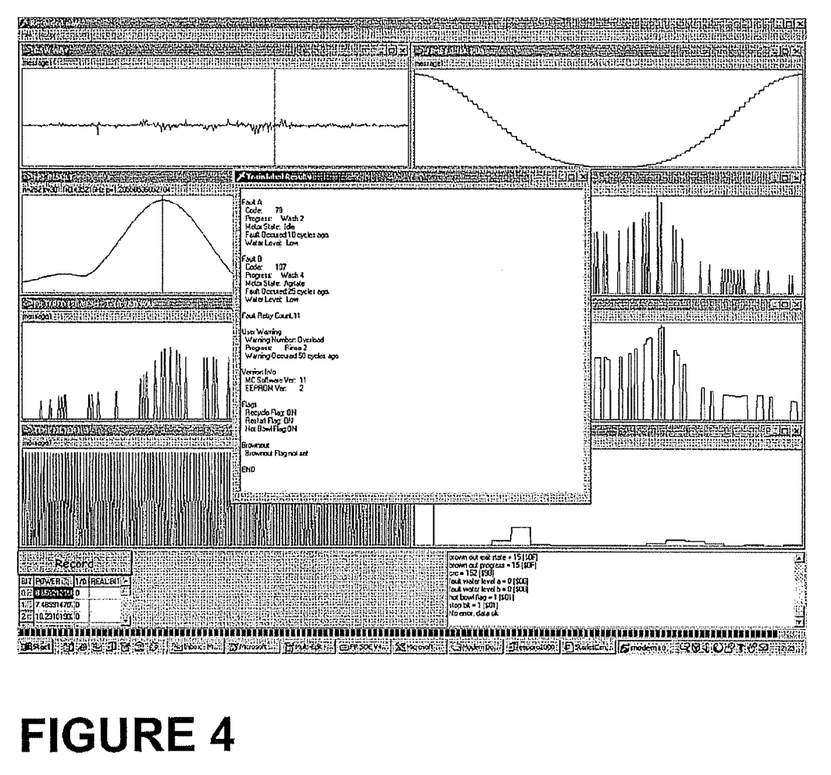
FIG. 4 is a screenshot of the PC based modem download software. The software is displaying a successful modem download and decoded results.

FIG. 4 shows a screenshot of the data receiving software package running on a personal computer. This software receives filters and decodes the appliance download data. The data is captured as a digital audio recording, for example a .wav file, and decoded after the recording has been made.

A number of filtering techniques are employed to receive and decode the download data.

The software initially captures the raw signal as a digital audio recording.

Figure 5:
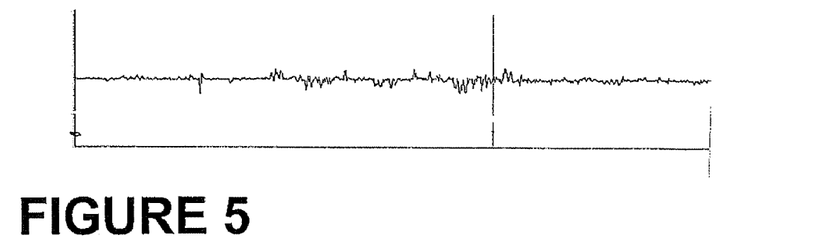
FIG. 5 is a graph of the raw data wave form.

FIG. 5 shows a sample of raw data as received by the PC. This waveform represents approximately a typical full download of around 50 seconds.

The software applies a Fast Fourier Transform to the digital audio recording to determine the centre frequency of the transmission.

Figure 6:
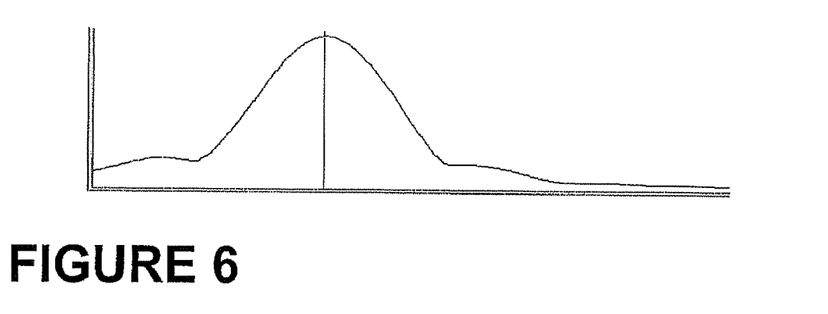
FIG. 6 illustrates fast transform results, scanning around the nominal carrier frequency. The result peaks when the actual frequency is found.

FIG. 6 shows the results of a Fast Fourier Transform (FFT) on the sample data of FIG. 5. The frequency that the appliance controller tone generator generates is directly related to the microprocessor clock. As the clock (RC resonator) has a certain tolerance the actual frequency produced may differ from the frequency the motor controller is attempting to generate. The FFT is used to determine the centre frequency of the transmission.

The software applies a frequency filter at the centre frequency determined by the Fast Fourier Transform.

Figure 7:
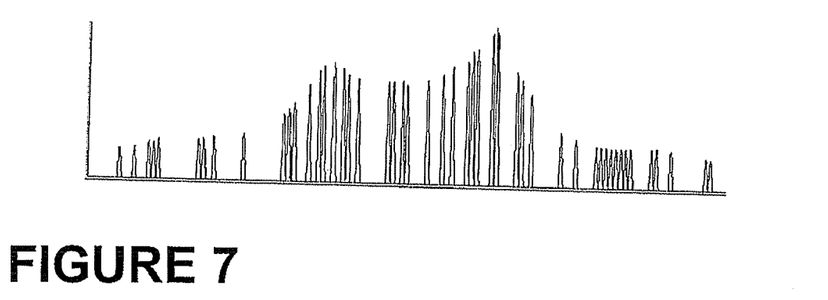
FIG. 7 is a graph of target frequency strength with respective time.

FIG. 7 shows the results when a frequency filter is applied at the frequency determined from the FFT maxima. This graph shows the signal strength at the data frequency for each bit window along the raw data packet.

The software generates a time filter based on the centre frequency determined by the Fast Fourier Transform. This is a square wave with peaks of 1 and troughs of 0 the waveform peaks appear where a bit could be present according to the data spacing in the data download protocol. For example alternating peaks and troughs each of duration 200 ms for the preferred protocol.

Figure 8:
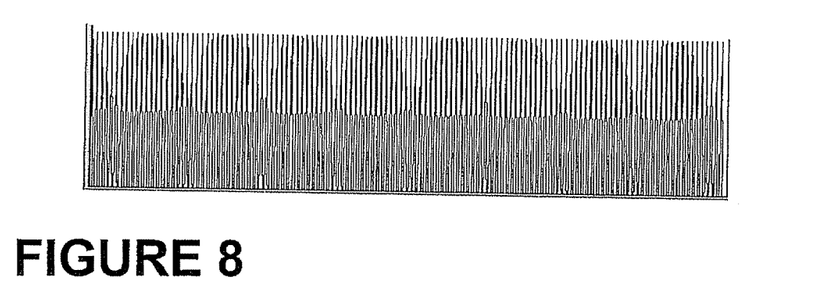
FIG. 8 is a time based filter. Illustrating simple square wave.

FIG. 8 shows a time filter that is produced based on the centre frequency determined from the FFT shown in FIG. 6. This is a square wave with peaks of 1 and troughs of 0. Ideally the waveform peaks appear where a bit could be present. As this is directly related to the motor controller clock centre frequency the square wave frequency is the same as the FFT result in FIG. 6.

The software aligns the generator time filter with the frequency filtered data. The software may achieve this by calculating a product of a section of the data sequence and a section of the time filter for different temporal alignments of the time filter relative to the filtered data. The alignment that produces the maximum product is used to apply the square wave time filter over the complete data waveform.

Figure 9:
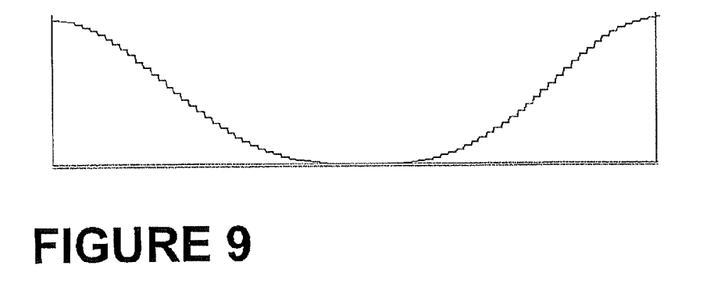
FIG. 9 is a graph showing the bit boundary alignment. The vertical line on the right highlights the maximum point.

FIG. 9 shows graphically the bit alignment process. To correctly use the time filter determined in FIG. 8 the bit boundaries must be correctly lined up. To do this the square-wave above is placed on the frequency filtered data (FIG. 7) and then shifted temporally until the maximum product is found. The maximum product is found where all the bit boundaries line up with the time filter. The alignment that produces maximum product is used to apply a frequency data mask.

Figure 10:
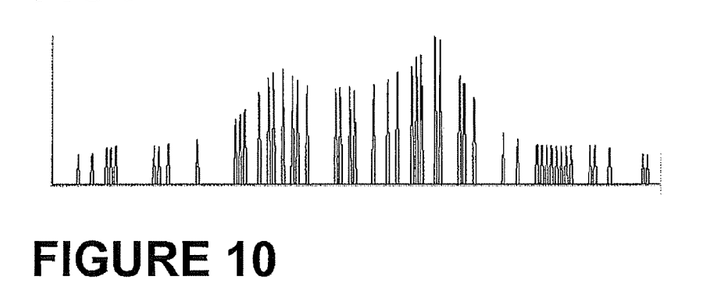
FIG. 10 is a graph illustrating resulting data. Once the frequency filter and bit boundary aliened time based filter has been applied.

FIG. 10 shows the effect of the square wave time filter on the frequency-filtered data once the bit boundaries have been aligned. The effect of the filter is to maximise the signal and minimalise noise generated by echoes and redundant data that are present on the recorded waveform.

The software may improve the signal clarity by integrating the filtered data along each bit boundary.

Figure 11:
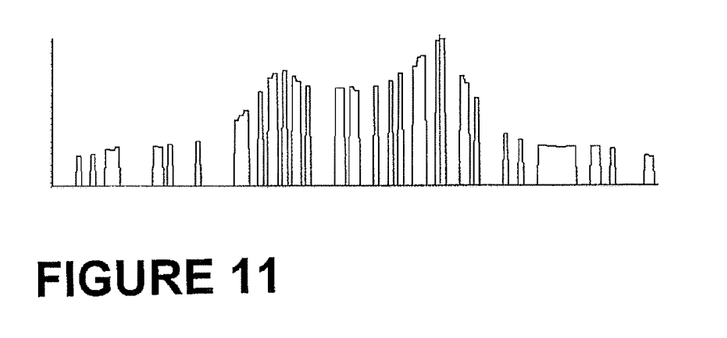
FIG. 11 is a graph of the resulting output once filtered data is integrated along each boundary.

FIG. 11 shows the resulting data, once frequency filter, and bit boundary aligned time based filter has been applied. It also shows the effect of integrating the filtered data from FIG. 10 along each bit boundary. The area under the waveform represents the bit energy for each data bit.

Figure 12:
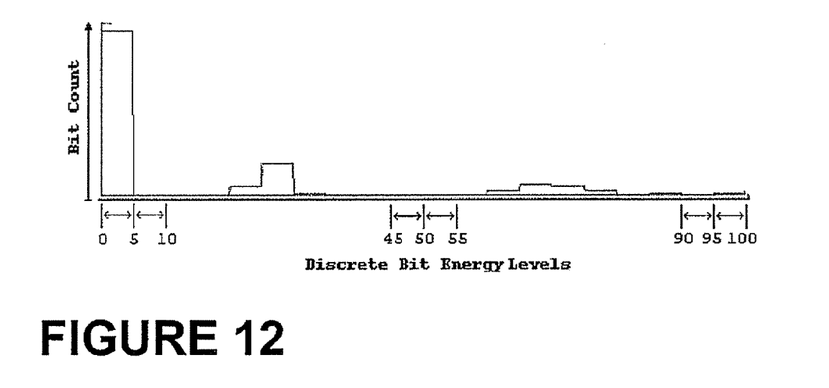
FIG. 12 is graph illustrating a bit histogram.
Figure 13:
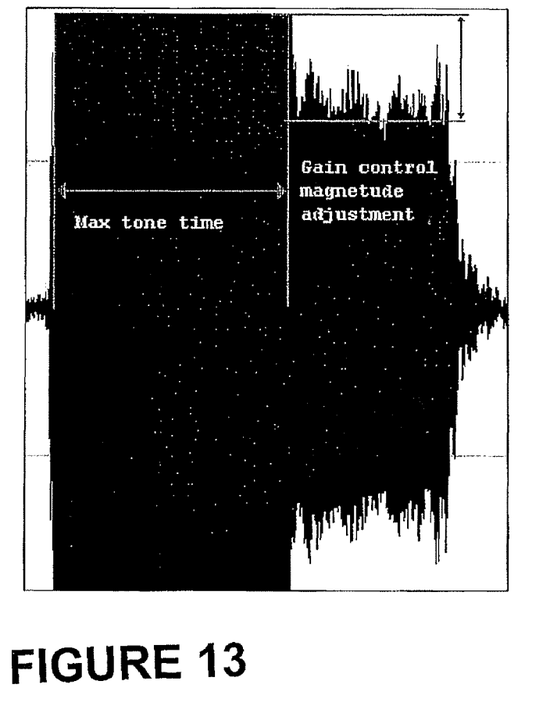
FIG. 13 is a graph showing a section of recorded received signal illustrating the effect some phones impose on long duration sounds.
Figure 14:
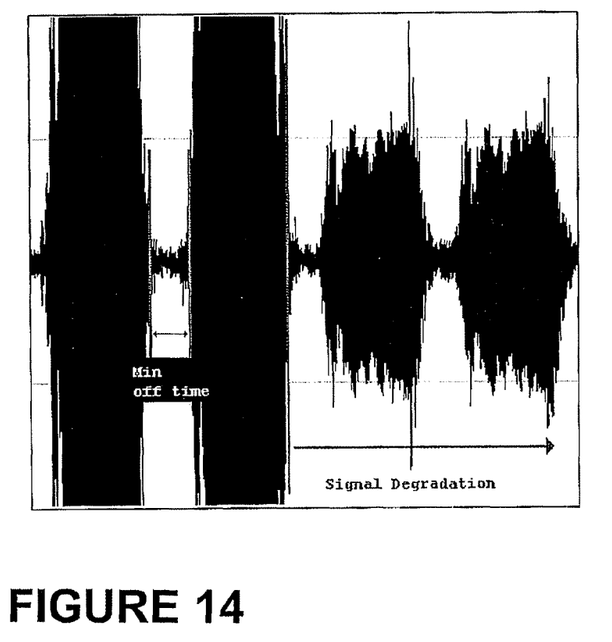
FIG. 14 is a graph showing a section of recorded received signal illustrating the effect some phones impose on short duration intermittent sounds.

The preferred software uses a adaptively determine the level of a 1 and 0 a bit. Ideally all the zeros should be on the left side of the graph, while all the ones are on the right side. In reality however this is not usually the case as can be seen in FIG. 12. This graph counts the number of bits that fall within 5% steps of the maximum 'energy' bit. In this case ones appear scattered throughout the energy range. The source data in FIG. 12 shows this variation as a variation in 'energy' levels from bit to bit in the download.

To minimise the variation in bit energy the preferred software uses a thresholding technique. The software finds the one-zero threshold by looking for the largest gap between two sets of bits in the histogram. In this case it is in the 10% range. The one-zero threshold is assigned to be 10% of the highest 'energy' bit in the download. This technique provides a logic level system that varies from download to download depending on conditions The receiver software then translates the data into a form that can be used by service technicians and other support staff. An example of the final translated data can be seen in FIG. 4.

Testing by the inventors showed that the critical parameter for the emitted tone sequence that primarily effected the ability for the mobile handset to receive and send the sound signal without corruption was the time between individual generator tones. The inventors tested the protocol against 13 mobile telephone handsets and found that the minimum duration without tone required to avoid activating the automatic gain control varied from 50 ms to 125 ms among the phones tested. The selected preferred duration of 200 ms provides a useful level of tolerance.

The invention claimed is:

1. An appliance having a diagnostic capability, said appliance comprising:
   a tone generator,
   a controller,
   a data collection function and memory for storing collected data, and
   a transmitter for transmitting a stream of data derived from said stored data, using a carrier having a transmission frequency, wherein said transmission includes:
   switching the carrier on and off according to bits in the stream of data derived from said stored data, and
   interleaving each bit for transmission with an off period of the carrier.

2. An appliance as claimed in claim 1, wherein said transmission frequency is a frequency within the frequency band of telephone systems.

3. An appliance as claimed in claim 1, wherein said transmission bit has a duration less than 1000 ms.

4. An appliance as claimed in claim 1, wherein said controller is programmed to activate said tone generator for user interface functions.

5. An appliance as claimed in claim 1, wherein said transmission frequency is between 300 Hz and 4000 Hz.

6. An appliance as claimed in claim 1, wherein said transmission frequency is between 250 Hz and 3000 Hz.

7. An appliance as claimed in claim 1, wherein said transmitter causes said tone generator to generate additional sound, in said off periods of said carrier that is outside the frequency band of the telephone system, but is audible to humans.

8. An appliance as claimed in claim 7, wherein said additional sound is below 250 Hz.

9. An appliance as claimed in claim 7, wherein said additional sound may be continuous or intermittent, and may have a constant or varying frequency.

10. An appliance as claimed in claim 1, wherein said transmitter is adapted to transmit said data stream as a formatted packet, and to transmit data identifying a data format applicable to said data packet.

11. An appliance as claimed in claim 10, wherein said identifying data comprises a header preceding the packet.

12. An appliance as claimed in claim 11, wherein said transmitter transmits said header using a carrier frequency distinct from the carrier frequency used for transmitting said data packet.

13. An appliance as claimed in claim 1, wherein each off period of said carrier has a duration of at least 50 ms.

14. An appliance as claimed in claim 1, wherein each off period of said carrier has a duration of at least 100 ms.

15. A computer for use in conjunction with an appliance having a diagnostic capability, said computer executing the steps of:
   executing a program to receive a signal, generating a digital representation of said signal, processing said digital representation to find the centre frequency of said signal, processing said digital representation with a filter at said centre frequency, generating a temporal bit map according to said centre frequency based on an expected sequence of data-bits interleaved with off periods, and aligning said temporal bit map with said filtered digital representation to extract the data bits.

16. A computer as claimed in claim 15, wherein said digital representation is a standard audio file.

17. A computer as claimed in claim 15, wherein said program finds said centre frequency by performing a Fast Fourier Transform on said digital representation and identifying the frequency at which the peak magnitude appears in the spectrum.

18. A computer as claimed in claim 15, wherein said temporal bit map has a bit period according to the bit width chosen for transmission.

19. A computer as claimed in claim 16, wherein said bit period is determined in a transmission preamble.

20. A computer as claimed in claim 15, wherein said temporal bit map is a square wave.

21. A computer as claimed in claim 18, wherein said program shifts said temporal bit map relative to said filtered digital representation to find a point of maximum product, said point of maximum product corresponding to said temporal bit map aligning with bit boundaries of the filtered signal.

22. A computer as claimed in claim 19, wherein said program sets a zero—one amplitude threshold for said digital representation.

23. A computer as claimed in claim 15, wherein said off periods have a duration of at least 50 ms.

24. A computer as claimed in claim 15, wherein said off periods have a duration of 200 ms.

* * * * *